United States Patent [19]
Joiner et al.

[11] Patent Number: 5,675,373
[45] Date of Patent: Oct. 7, 1997

[54] INTERACTIVE TELEVISION SERVICE UTILIZING BOTH UNIDIRECTIONAL AND OMNIDIRECTIONAL BROADCASTING

[75] Inventors: Marion Douglas Joiner; Gary Allen Almgren, both of Ocala, Fla.

[73] Assignee: Marion County School Board, Ocala, Fla.

[21] Appl. No.: 292,989

[22] Filed: Aug. 19, 1994

[51] Int. Cl.[6] ............................................. H04N 1/00
[52] U.S. Cl. ........................... 348/13; 348/17; 348/15; 348/14; 455/5.1
[58] Field of Search ..................... 348/13, 16, 15, 348/6, 17, 7, 8, 10, 12, 14; 455/3.1, 3.2, 4.1, 5.1, 6.1, 63

[56] References Cited

U.S. PATENT DOCUMENTS

| 4,360,827 | 11/1982 | Braun | 348/15 |
|---|---|---|---|
| 4,386,365 | 5/1983 | Gargini | 348/13 |
| 4,645,872 | 2/1987 | Pressman et al. | 348/15 X |
| 4,650,929 | 3/1987 | Boerger et al. | 348/15 |
| 4,785,472 | 11/1988 | Shapiro | 348/13 |
| 5,263,869 | 11/1993 | Ziv-El | 434/336 |
| 5,394,559 | 2/1995 | Hemmie et al. | 455/5.1 |

OTHER PUBLICATIONS

William J. Clark. Multipoint Multimedia Conferencing, IEEE Communications Magazine, pp. 44–50 May 1992.

*Primary Examiner*—John K. Peng
*Assistant Examiner*—Nathan J. Flynn
*Attorney, Agent, or Firm*—Saliwanchik, Lloyd & Saliwanchik

[57] ABSTRACT

The invention concerns an interactive television service in which multiple broadcasting facilities are interconnected through a single broadcast site so that each broadcast facility may interact freely with one another. A method is provided to allow a single broadcasting site to originate a broadcast and retain complete control of that broadcast in which all participating broadcasting sites can engage in two-way audio and full motion video discourse with the originating site as well as with all participating sites during the course of the broadcast. The method utilizes only two broadcast frequencies.

24 Claims, 2 Drawing Sheets

INTERACTIVE TELEVISION SERVICE UTILIZING BOTH UNIDIRECTIONAL AND OMNIDIRECTIONAL BROADCASTING

BACKGROUND OF THE INVENTION

After World War I, the development of radio broadcasting accelerated to a point where there were many more stations operating than could be accommodated by the limited number of radio wavelengths available. In response to a communication system that had become chaotic, Congress enacted the Radio Act of 1927. The Radio Act of 1927 was incorporated into the Communications Act of 1934 which is in force today. The Act now controls all broadcasting including radio and television. The purpose of the Act is to "make available, so far as possible, to all the people of the United States a rapid, efficient, Nation-wide and world-wide wire and radio communication service."

The Act sets forth one method for providing such service by establishing a scheme for licensing broadcasters. Under the licensing scheme broadcasters apply to the Federal Communications Commission (FCC) for the right to broadcast exclusively upon a specified frequency. Additionally, the FCC may reserve groups of frequencies for a specified use in order to serve the public interest. The Federal Communications Commission has reserved a set number of microwave frequencies to be used for educational purposes within the Instructional Television Fixed Service (ITFS) microwave distribution system. The reserved frequencies are grouped to include four frequencies (or channels) per group. School systems apply for licenses to use a channel, or groups of channels, and if awarded a license hold the exclusive right for its use. The FCC has provided that a school system holding rights to any of these special channels may broadcast in an omnidirectional manner from a central ITFS broadcast station to surrounding schools or remote stations. Normally, conventional microwave transmissions are broadcast in a unidirectional or point to point manner.

With the advent of distance learning, these reserved frequencies are becoming more and more valuable to the school systems holding the licenses. Lessons may be broadcast to homebound students as well as to students in remote areas. Dwindling budgets have caused schools to pare down their curriculum and many rural schools are now unable to offer advanced placement courses for college credit. School systems with broadcast capabilities can share these specialized lectures or courses between the schools spreading the cost and benefit of an expanded curriculum amongst all schools.

To ensure that all students attain the ultimate benefit from shared lectures it is necessary that all students are able to fully participate in each lesson. An interactive broadcast service assures this result. An interactive broadcast service includes an originating broadcast carrying the lecture or lesson and provides for the complete audio and full motion video participation of all other interested sites. Under the current ITFS system, such a service requires the use of a number of precious frequencies. The originating broadcast can be made from the central station where it is broadcast to participating schools. Each participating school must broadcast questions or comments on a separate frequency back to the central station. Each school's questions or comments are sorted and rebroadcast from the central station to the surrounding schools. It is the central station not the originating broadcast site that controls which site is being broadcast.

Recently, the FCC has instituted the Multichannel Multipoint Distribution Service (MMDS) which sets aside frequencies or channels for use by wireless cable companies. The FCC has already taken two groups of channels that had originally been reserved for the ITFS system for MMDS use. The frequencies available for use in any area of broadcasting are limited. For school systems and educational services, however, the frequencies available are dwindling further.

BRIEF SUMMARY OF THE INVENTION

The subject invention concerns an interactive television service and methods for its use. The subject invention is exemplified for use in a school system setting. Currently, many school systems are sen, iced by an Instructional Television Fixed Service (ITFS) microwave distribution system. A central ITFS broadcast station transmits a signal in all directions to reach individual schools in the district. The method of the subject invention provides a service where any one school can originate a broadcast and each participating school has complete audio and full-motion video interaction with the broadcasting school and can be viewed by numerous others.

In a preferred embodiment of the subject invention, the originating broadcast is transmitted to a central station on frequency 1. The broadcast is retransmitted from the central station to all participating schools on frequency 2. When a participating school has a question or comment, the school originating the broadcast switches its transmission off and the participating school's transmission on. The question is transmitted to the central station on frequency 1 and rebroadcast to all schools on frequency 2. After the question has been asked and answered, the original broadcasting school will turn the participating school's transmission off and itself back on. This new system therefore utilizes only two frequencies to conference in any number of schools.

DETAILED DISCLOSURE OF THE INVENTION

Figure 1:
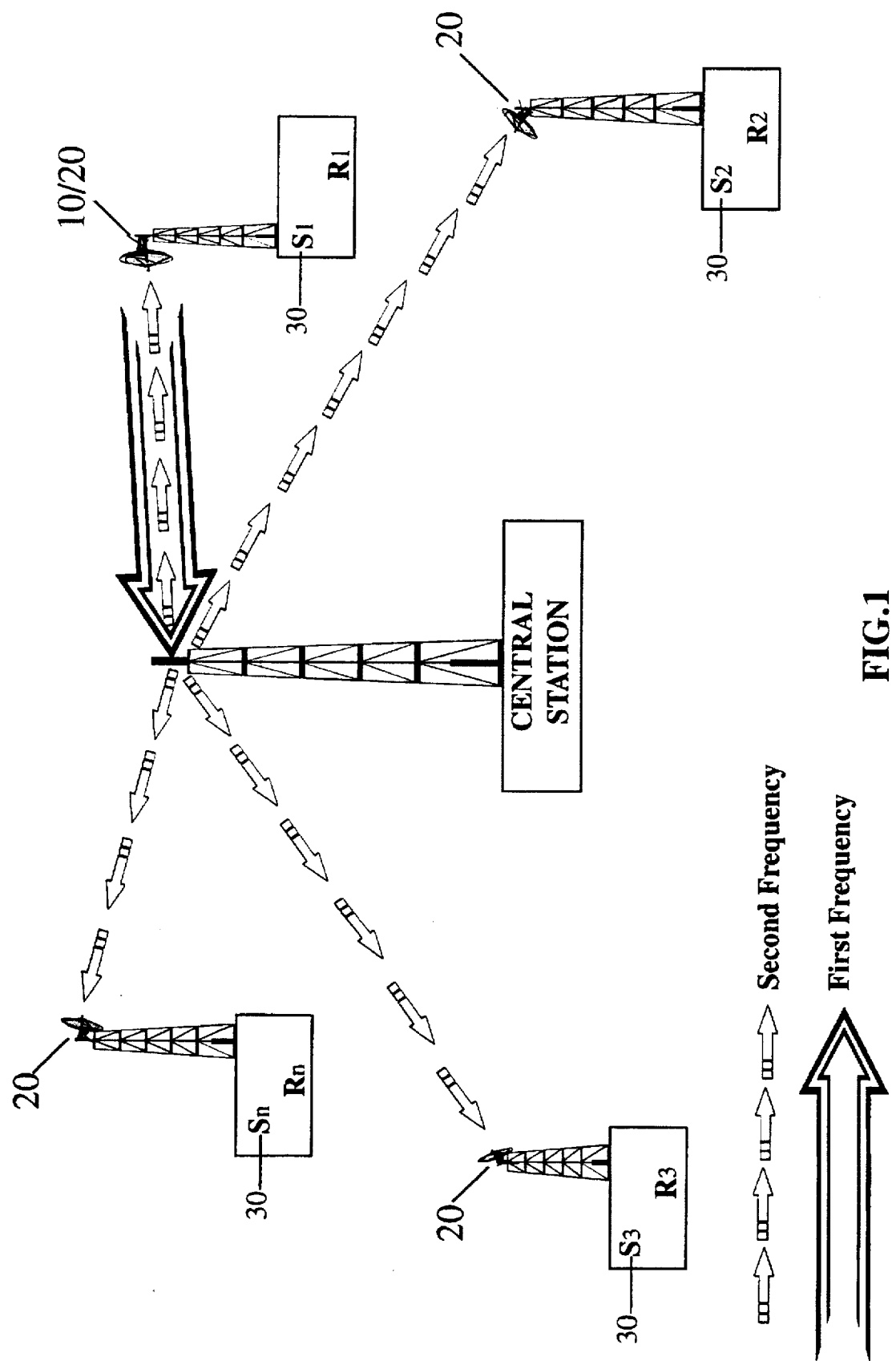
FIG. 1 illustrates the key architectural and functional features of the interactive television service of this invention with a first station in command of the system.

Referring to FIG. 1, there is provided an architectural and functional representation of this invention which illustrates the elements of claim 1 of this disclosure. A plurality of remote broadcast sites are shown as R1, R2, R3, up to and including Rn. Site R1 is shown to have a means 10 for generating and transmitting an audio and full motion video signal in a unidirectional manner to a central station. A means for receiving a signal, 20, from the central station is shown on each of the remote stations R2, R3, to Rn and the station R1 from which the broadcast originates. Each remote station R1–Rn is shown to have a switch means S1–Sn, 30, for initiating or terminating transmission of signal from that site. As diagrammed in FIG. 1, R1 is the "host", while all of the other remote sites R1–Rn are receive-only sites. The signal generated from site R1 is transmitted in a unidirectional manner to the central station on a first channel (frequency 1), and the central station then rebroadcasts the signal to all of the remote sites (omnidirectional broadcast) on a second channel (frequency 2).

Figure 2:
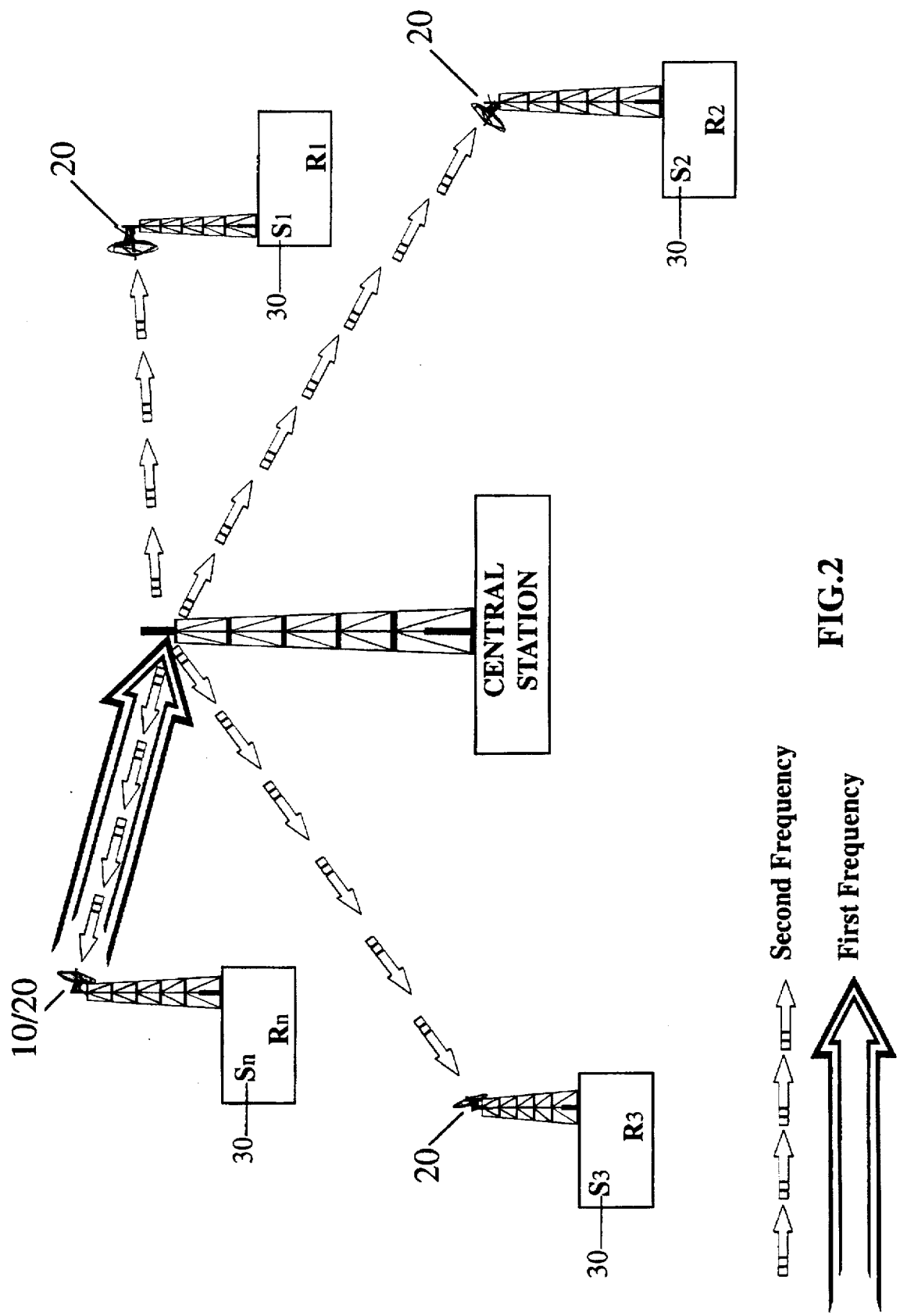
FIG. 2 illustrates the key architectural and functional features of the interactive television service of this invention with a second station in command of the system.

FIG. 2 illustrates the siutation after the original broadcast site (R1 in FIG. 1) has used switch S1 to turn off transmission from site R1 and turn on transmission from the Rn.

Signal transmitted to the central station from site Rn on a first channel is then rebroadcast to all sites on a second channel (frequency 2).

The invention concerns an interactive communication system in which multiple broadcasting and receiving facilities may interact freely with one another. Advantageously, the free interaction achieved with the system of the subject invention can be accomplished using only two frequencies. The subject invention provides an interactive television service which offers audio and full motion video communication between the participants and among other receive-only sites. The invention is exemplified for use in a school system setting.

The subject interactive television service comprises a central broadcast station and a plurality of remote broadcast stations. Further, the subject service can comprise non-broadcast sites having only interactive audio communication with the service or being receive-only sites. The central station can have audio-visual equipment and facilities to create a broadcast and comprises a central transmitting antennae capable of broadcasting in an omnidirectional manner and an automatic control to selectively activate and deactivate remote transmitters. Each remote broadcast station comprises audio-visual equipment to create a broadcast a transmitting antenna and a control to turn its transmitter on or off. Transmitting antennae are capable of both broadcasting and receiving microwave signals.

In a specific example of the method of the subject invention, a teacher at school A can share a calculus lecture with all interested schools. The original broadcasting school, or host school, school A, transmits a unidirectional microwave signal carrying the lesson on frequency 1 to the central station. The central station upon receiving the signal rebroadcasts the signal on a different frequency, frequency 2, in an omnidirectional manner to be received by all participating and receive-only schools. When participating school B wishes to ask a question of the calculus teacher, school B communicates to school A its desire to participate. This can be done in a variety of ways including the use of existing telephone lines as well as through a computer network such as mainframe, APPLETALK, NOVELL, or IBM AS400. Once school B has communicated its desire to participate, the teacher at school A via a control means turns school A's transmitter off and turns school B's transmitter on to allow school B to transmit an audio and full-motion video signal carrying the question on frequency 1 to the central station. The question is rebroadcast from the central station on frequency 2 to all schools (including school A) viewing the lecture. The control means by which school A can turn the transmitter at school B on or off can be, for example, an autodialer as described below.

While the question is being asked and answered, the teacher at school A can still be heard by all students via audio connection. Continuous audio communication can be established in a number of ways including telephone communication, two-way radio, cellular phone, fiber optics and coaxial cable communication or CB radio. All students at the host school, participating schools, and receive-only schools may therefore watch and listen as the student works through the calculus problem under the guided direction of the host teacher. After the question has been answered, the original broadcasting school (A) turns school B's transmitter off and itself back on to continue the lesson. The broadcasting school A retains ultimate control of the broadcast in that the broadcasting school determines which school is transmitting and for how long each transmission continues.

Although this new method of broadcasting is exemplified above using only the original broadcasting school and a participating school B, schools C, D, E, etc. can fully and actively participate in the lesson as well. School A has complete control of each school's transmitter so it can freely turn itself off and another on to ask questions of a participating school or to allow a participating school to broadcast its own questions and comments on frequency 1. Additionally, any one of the schools in the district can be an original broadcasting school and host its own lecture at any designated time.

This new method of broadcasting utilizes only two frequencies. A signal on frequency 1 is broadcast in an unidirectional manner to the central station; the signal is then rebroadcast on frequency 2 in an omnidirectional manner from the central station to surrounding schools. The system utilizes only two frequencies because each school's broadcast can be turned on and off. Further, any single original broadcasting site retains control of the entire broadcast and is not dependent upon a controller/technician at the central station.

To provide a comparable interactive television service under the current ITFS system, a frequency for each school participating in the broadcast as well as a frequency for the omnidirectional broadcast from the central station must be utilized. As a specific example, under the current system, the original broadcasting site, school A, broadcasts the calculus lecture on frequency 1 in a unidirectional manner to the central station. The central station then rebroadcasts the lesson in an omnidirectional manner on frequency 2 to surrounding school as done in the system of the subject invention. Unlike the subject method however, each participating school must broadcast questions or comments to the central station on a new frequency. School B transmits a question on frequency 3 to the central station. School C transmits a comment on frequency 4 to the central station. The technician at the central station then decides the order in which to rebroadcast the questions and comments in an omnidirectional manner on frequency 2 so that all schools, including the original broadcasting school, school A, can hear and see the question. In contrast to the subject invention, this system utilizes far more frequencies than just two. Further, the central station operates the broadcast as opposed to the teacher who is actually teaching the lesson.

Only two frequencies are used because of the ability of the original broadcasting station, school A or B or C, etc., to turn its own transmission on and off. The original broadcasting station also can turn transmissions of the other stations on and off. This is effectuated by a control means. The control means includes any device that can send a tone to the central tower which is broadcast to all schools to turn a remote transmitter on or off. Each transmitter has its own control code. Transmitter control can be accomplished by computer, audible tones on TV subcarriers, dedicated telephone lines, or various combinations of the above. In a preferred embodiment, a simple telephone autodialer is used as the control means. If a participating school, school B, has a question, the broadcasting school, school A, sends a tone control code to the central tower. The tone is broadcast from the central tower and turns school A's transmission off and school B's transmitter on. When the original broadcasting school has answered the question it sends a tone to the central tower which in turn switches school B's transmitter off and school A's transmitter on. Although the transmitters are actually switched on and off through the central station, the original broadcast station sends the control tone.

Some of the equipment associated with a standard ITFS system can be used to implement the subject interactive broadcasting system. Each remote site in an ITFS system has a receiving antennae. Newly installed at each site would be a single transmitter and a controller. A transmitter, coaxial transmission line and a parabolic transmitting antennae comprise the single transmitter. The antennae and transmission line are mounted on the existing ITFS tower. To minimize wind load to the existing structure grid-type antennas are preferred. Further, a small 10 watt transmitter is preferred for use and requires less than the equivalent of the power necessary to operate three 100 watt light bulbs.

The new method of broadcasting is not restricted for use with an ITFS service but can be used with MMDS, coaxial cable, fiber optics, digital circuit telephone and conventional microwave systems or with any combination of these services. Broadcast licenses are issued for conventional VHF and UHF stations that transmit to large geographic areas. Transmitting from several individual remote locations utilizing the same channel as is required by the subject invention could be prohibited by the FCC. Therefore under current regulatory rules, conventional VHF and UHF television broadcast stations may not be appropriate for use in the service of the subject invention. Conventional broadcasting may however be used to extend the coverage of the subject system.

Coaxial cable and fiber optic cable provide a wide bandwidth that can carry a large number of channels. Cable is limited in that new installations require access to right-of-ways to lay the lines, cost therefore somewhat relies on distance and could hinder economic feasibility. Coaxial cable used in combination with an ITFS system however, works well in situations where a remote site is too close to the central station to make over-the-airways broadcasting cost effective.

Digital telephone circuits provide another means by which to achieve the service of the subject invention. Digital circuits require video to be digitalized and compressed at the sending end then to be expanded and converted to analog at the receiving end. This is accomplished by as encoder-decoder or CODEC. Telephone circuits are also somewhat dependent upon distance for cost. The cost of leasing these circuits may effect the number of miles between sites. Further, video quality is restrictive with digital telephone circuits.

Conventional microwave service is available in digital or full motion analog video. Digital microwave, as digital telephone circuits do, requires use of a CODEC. Full motion analog video for conventional microwave is therefore more cost effective. ITFS systems using microwave transmissions are allowed to transmit using five times the power of a conventional microwave system. This allows for a single receiver antennae at the central tower. In a conventional system, a separate receiving antennae would have to be provided for each school that was transmitting. A single tower would most likely not be able to support an entire school system worth of receivers.

Although there appears to be major drawbacks with many of the alternative systems, the strength of these alternative systems is in their combination made to fit the geographic, economic and physical conditions of a particular need. The subject invention may be used in situations besides school systems including use in the military, among banking institutions or hospitals, on a college or governmental campus or within a single building.

It should be understood that the examples and embodiments described herein are for illustrative purposes only and that various modifications or changes in light thereof will be suggested to persons skilled in the art and are to be included within the spirit and purview of this application and the scope of the appended claims.

We claim:

1. A method for providing an interactive television service having audio and full motion video communication between a plurality of remote broadcast sites, each of said remote broadcast sites having a means for generating and transmitting an audio and full motion video signal in a unidirectional manner to a central station, a means for receiving a signal from said central station, and a switch means for having the transmission of a signal which said site is generating initiated or terminated, said method comprising the steps of:

(a) selecting any one remote broadcast site as an original broadcast site;

(b) generating an audio and full motion video signal at said original broadcast site and transmitting said signal on a first frequency in a unidirectional manner to said central station;

(c) rebroadcasting said signal from said central station on a second frequency in an omnidirectional manner to said plurality of remote broadcast sites;

(d) to initiate interactive communication with a second remote broadcast site, terminating said unidirectional signal of said first frequency from said original broadcast site, generating an audio and full motion video signal at said second remote broadcast site, and transmitting said signal on said first frequency in a unidirectional manner to said central station;

(e) rebroadcasting said signal from the central station on said second frequency in an omnidirectional manner to said plurality of remote broadcast sites including said original broadcast site;

(f) when said audio and full motion video signal from said original broadcast site is to be resumed, terminating said signal from said second remote broadcast site, generating a signal at said original broadcast site, and transmitting said signal on said first frequency to said central station; and (g) rebroadcasting said signal from said central station on said second frequency in an omnidirectional manner to said plurality of remote broadcast sites;

wherein the transmission and termination of said signals are directed by said original broadcast site.

2. The method, according to claim 1, wherein audio communication is retained among all broadcast sites at all times.

3. The method, according to claim 1, wherein said means for receiving a signal from said central station is a receiving antenna.

4. The method, according to claim 1, wherein the transmission and termination of said signals are directed by said original broadcast site by generating a tone at said original broadcast site which is transmitted on said first frequency in a unidirectional manner to said central station and is rebroadcast on said second frequency in an omnidirectional manner to switch said signals on and off.

5. The method, according to claim 4, wherein said tone is generated by a telephone autodialer.

6. The method, according to claim 1, wherein said signal on said second frequency is also received by two-way audio or receive-only sites.

7. A method for providing an interactive television service having audio and full motion video communication between a plurality of remote broadcast sites, each of said remote broadcast sites having a means for generating and transmitting an audio and full motion video signal in a unidirectional manner to a central station, a means for receiving a signal from said central station, and a switch means for having the transmission of a signal which said site is generating initiated or terminated, said method comprising the steps of:

(a) generating an audio and full motion video signal at an original broadcast site, wherein said original broadcast site may be a remote site or a broadcast site located at said central station, said signal being transmitted to said central station on a first frequency, and transmitting said signal from said central station on a second frequency in an omnidirectional manner to be received by said plurality of remote broadcasting sites;

(b) to initiate interactive communication with a remote broadcast site, terminating said signal, generating an audio and full motion video signal at said remote broadcast site, and transmitting said signal on a first frequency in a unidirectional manner to said central station;

(c) rebroadcasting said signal from said central station on said second frequency in an omnidirectional manner to said plurality of remote broadcast sites including said original broadcast site; and (d) when said audio and full motion video signal from said original broadcast site is to be resumed, terminating said signal from said remote broadcast site, generating a signal at said original broadcast site, and transmitting said signal on said second frequency in an omnidirectional manner to said plurality of remote broadcast sites;

wherein the transmission and termination of said signals are directed by said original broadcast site.

8. The method, according to claim 7, wherein said original broadcast site is said central station.

9. The method, according to claim 7, wherein said original broadcast site is a remote broadcast site.

10. The method, according to claim 7, wherein audio communication is retained among all broadcast sites at all times.

11. The method, according to claim 7, wherein said means for receiving a signal from said central station is a receiving antenna.

12. The method, according to claim 7, wherein the transmission and termination of said signals are directed by said original broadcast site by generating a tone at said original broadcast site which is transmitted from the central station on said second frequency in an omnidirectional manner to switch said signals on or off.

13. The method, according to claim 12, wherein said tone is generated by a telephone autodialer.

14. The method, according to claim 7, wherein said signal on said second frequency is also received by two-way audio or receive-only sites.

15. An interactive television system for providing audio and full motion video communication between a plurality of remote broadcast sites, said system comprising:

(a) a central station having a transmitting system and antenna capable of transmitting a signal in an omnidirectional manner and a means for receiving a signal from said remote broadcast sites;

(b) a plurality of remote broadcast sites having a transmitting system and antenna capable of generating and transmitting an audio and full motion video signal in a unidirectional manner to said central station, a means for receiving a signal from said central station, a switch means for having the transmission of a signal which said site is generating initiated or terminated; and (c) an original broadcast site having a transmitting system and antenna capable of generating and transmitting an audio and full motion video signal, a means for receiving a signal from said central station, a switch means for having the transmission of a signal which said site is generating initiated or terminated, and a control means for initiating and terminating broadcast signals;

whereby an audio and full motion video signal is generated at said original broadcast site and transmitted on a second frequency in an omnidirectional manner to be received by said plurality of remote broadcast sites, to initiate interactive communication with a remote broadcast, said signal is terminated and an audio and full motion video signal is generated at said remote broadcast site and transmitted on a first frequency in a unidirectional manner to said central station wherein said signal is rebroadcast on a second frequency in an omnidirectional manner to said plurality of remote broadcast sites including said original broadcast site and when said audio and full motion video signal from said original broadcast site is to be resumed, said signal from said remote broadcast site is terminated and a signal is generated at the original broadcast site and transmitted on a second frequency in an omnidirectional manner to said plurality of remote broadcast sites, wherein the transmission and termination of said signals are directed by said control means at said original broadcast site.

16. The system, according to claim 15, wherein said means for receiving a signal is a receiving antenna.

17. The system, according to claim 15, wherein said control means generates a tone which is transmitted from said central station on said second frequency in an omnidirectional manner to switch said signals on and off.

18. The system, according to claim 17, wherein said control means is a telephone autodialer.

19. The system, according to claim 15, wherein said central station further comprises means for generating an audio and full motion video signal.

20. The system, according to claim 15, further comprising a plurality of two-way audio or receive-only sites.

21. An interactive television system comprising:

(a) a plurality of remote sites which can act as broadcast or receive sites;

(b) a central broadcast station;

(c) a first broadcast frequency for broadcasting a signal in a unidirectional manner from any of said plurality of remote sites to said central broadcast station; and (d) a second broadcast frequency for broadcasting a signal in an omnidirectional manner from said central broadcast station to said plurality of remote sites;

wherein, at any given time, any one of said plurality of remote sites can act as a host site controlling which site within the interactive television system is able to transmit audio signals, video signals or both, in a unidirectional manner, to said central broadcast station on said first broadcast frequency for omnidirectional rebroadcast from said central broadcast station to said plurality of remote sites on said second frequency.

22. The interactive television system of claim 21 wherein said host controls which site within the interactive television system is able to transmit audio signals, video signals or both by means of a switch which turns said host site's transmission off and turns any of said remote sites' transmission on.

23. The interactive television system of claim 20 wherein said first frequency and said second frequency are microwave signals or other means of connecting any remote site with the central broadcast site.

24. An interactive audio and video system comprising:
(a) a plurality of remote sites which can act as broadcast or receive sites;
(b) a central broadcast station;
(c) a first broadcast frequency for broadcasting a signal in a unidirectional manner from any of said plurality of remote sites to said central broadcast station; and
(d) a second broadcast frequency for broadcasting a signal in an omnidirectional manner from said central broadcast station to said plurality of remote sites;

wherein the signal broadcast by any given remote site on said first broadcast frequency, upon receipt at said central broadcast station, is rebroadcast omnidirectionally from said central broadcast station to said plurality of remote sites.

* * * * *

UNITED STATES PATENT AND TRADEMARK OFFICE
CERTIFICATE OF CORRECTION

PATENT NO.   : 5,675,373

DATED        : October 7, 1997

INVENTOR(S)  :

Marion Douglas Joiner and Gary Allen Almgren

It is certified that error appears in the above-identified patent and that said Letters Patent is hereby corrected as shown below:

Column 2, line 12: "sen, iced" should read --serviced--;

line 59: "R1-Rn" should read --R2-Rn--;

line 67: "from the Rn." should read --from site Rn.--.

Signed and Sealed this

Sixth Day of January, 1998

Attest:

BRUCE LEHMAN

Attesting Officer

Commissioner of Patents and Trademarks